United States Patent
Wenger

(10) Patent No.: US 11,773,859 B2
(45) Date of Patent: Oct. 3, 2023

(54) METHOD FOR OPTIMIZING THE EFFICIENCY AND/OR THE RUNNING PERFORMANCE OF A FAN OR A FAN ARRANGEMENT

(71) Applicant: ZIEHL-ABEGG SE, Künzelsau (DE)

(72) Inventor: Bjoern Wenger, Schrozberg (DE)

(73) Assignee: ZIEHL-ABEGG SE, Kunzelsau (DE)

(*) Notice: Subject to any disclaimer, the term of this patent is extended or adjusted under 35 U.S.C. 154(b) by 521 days.

(21) Appl. No.: 16/967,690

(22) PCT Filed: Feb. 4, 2019

(86) PCT No.: PCT/DE2019/200008
§ 371 (c)(1),
(2) Date: Aug. 5, 2020

(87) PCT Pub. No.: WO2019/149325
PCT Pub. Date: Aug. 8, 2019

(65) Prior Publication Data
US 2021/0033097 A1    Feb. 4, 2021

(30) Foreign Application Priority Data
Feb. 5, 2018   (DE) .................... 10 2018 201 708.5

(51) Int. Cl.
*F04D 27/00* (2006.01)
*F04D 25/08* (2006.01)
*F04B 49/06* (2006.01)

(52) U.S. Cl.
CPC .......... *F04D 27/001* (2013.01); *F04B 49/065* (2013.01); *F04D 25/08* (2013.01); *F04D 27/002* (2013.01); *F05D 2270/44* (2013.01)

(58) Field of Classification Search
CPC ...... F04D 25/08; F04D 27/001; F04D 27/002; F04D 49/065; F05D 2270/44; F05D 2270/71
(Continued)

(56) References Cited

U.S. PATENT DOCUMENTS

| 2011/0060571 A1* | 3/2011 | Ueda | G06F 30/23 703/9 |
| 2011/0230981 A1* | 9/2011 | Karpman | G05B 13/04 700/282 |

(Continued)

FOREIGN PATENT DOCUMENTS

| CN | 108825481 A | * 11/2018 | ............ F04B 49/065 |
| DE | 102014000825 | 7/2015 | |

(Continued)

*Primary Examiner* — Alexander B Comley
(74) *Attorney, Agent, or Firm* — FisherBroyles, LLP; Jason P. Mueller

(57) ABSTRACT

A method for optimizing the efficiency and/or the running performance of a fan, wherein, starting from component-specific or function-specific numerical detailed models, on the basis of at least one algorithm, a model reduction and thus data reduction (data refinement) to component-specific or function-specific behavior models takes place, wherein the reduced data of the behavior models are coupled or combined in a system simulation to form a system behavior model having input and output variables, and wherein the input variables and associated output variables of the fan from the system behavior model are provided to an optimizer for selection in order to achieve optimized control of the system depending on framework conditions.

10 Claims, 13 Drawing Sheets

Figure 1:
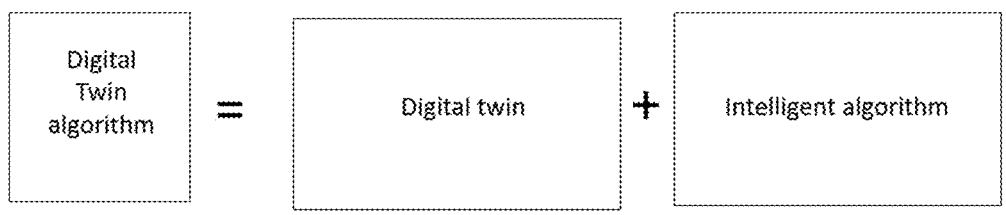

(58) Field of Classification Search
USPC .......................................................... 700/282
See application file for complete search history.

(56) References Cited

U.S. PATENT DOCUMENTS

2012/0010754 A1* 1/2012 Matteson ........... H05K 7/20836
361/679.48
2016/0333854 A1* 11/2016 Lund ....................... F03D 7/046

FOREIGN PATENT DOCUMENTS

| | | | | |
|---|---|---|---|---|
| DE | 102015118289 | | 4/2017 | |
| DE | 102015118289 A1 * | | 4/2017 | ........... F04D 27/001 |
| EP | 1420153 | | 5/2004 | |
| EP | 1420153 A2 * | | 5/2004 | ................ F02C 9/00 |
| EP | 1669226 A1 * | | 6/2006 | ........... B60H 1/0073 |
| EP | 1669226 A1 | | 6/2006 | |
| EP | 1669226 B1 | | 2/2010 | |
| EP | 2947329 | | 11/2015 | |
| EP | 2947329 A1 * | | 11/2015 | ........... F04D 25/166 |
| JP | 2011048768 A * | | 3/2011 | |
| JP | 2011059740 A | | 3/2011 | |
| JP | 2011243126 A | | 12/2011 | |
| JP | 2015185143 A | | 10/2015 | |
| JP | 2017078943 A | | 4/2017 | |
| JP | 2017191607 A | | 10/2017 | |
| RU | 2561180 C2 | | 8/2015 | |
| RU | 166358 U1 | | 11/2016 | |
| RU | 2636095 C2 | | 11/2017 | |
| WO | WO-2017072154 A1 * | | 5/2017 | ........... F04D 27/001 |

\* cited by examiner

Parameters for the design of bearing grease lifetime
- Continuous operation,
- Bearing type: 608-2Z
- Viscosity: 70
- Speed: 1290 rpm
- Grease temperature: 110°C
- Operating time/service life: 40,000 h Calculation example

| Time of day | temperature | factor | Consumed lifetime |
|---|---|---|---|
| 0:00 - 0:01 | 110°C | 1 | 1 min |
| 0:01 - 0:02 | 120°C | 2 | 2 min |
| 0:02 - 0:03 | 130°C | 4 | 4 min |
| 0:03 - 0:04 | 140°C | 8 | 8 min |

Result
- Operating hours: 4 min
- Consumed lifetime: 15 min

METHOD FOR OPTIMIZING THE EFFICIENCY AND/OR THE RUNNING PERFORMANCE OF A FAN OR A FAN ARRANGEMENT

This disclosure relates to a method for optimizing the efficiency and/or the running performance of a fan or a fan arrangement. Ultimately, this involves all the parameters of a fan that are to be optimized, including the service life, for example. Interactions with other fans, the environmental conditions, and/or the people who are located or work in the surroundings of the fan also play a role. So-called multitarget optimization is also included.

At this point it should be noted that the more fans and/or external devices are included in the optimization, the greater the potential for increasing efficiency. One example of this is the load distribution in the case of an arrangement of multiple fans.

This disclosure is based on the basic concept of ensuring the best possible efficiency and the best possible running performance at every operating point of the fan. This is difficult due to opposing operating parameters.

It is known from the practical experience of a fan that the ball bearing and the ball bearing grease are important parameters for the service life of the fan. The service life of the ball bearing and the ball bearing grease largely depends on the operating temperature in or on the motor and the mechanical forces acting on the ball bearing. Since neither temperature sensors nor force sensors are positionable in the immediate vicinity of the bearing, neither the bearing temperature nor the bearing forces acting on the bearing may be measured. It is therefore necessary to either measure these parameters indirectly or to determine them arithmetically.

A system and a method for determining the state of the bearing of an electric machine are known from DE 10 2010 002 294 A1. Real sensor units determine a measured value that is transmitted to a simulation unit. A result value is determined by the simulation unit, which is either a bearing current value or a value dependent on the bearing current. The result value is transmitted to another unit for further calculation. The known system/method is complex due to the required sensors and is difficult to use in fans due to the lack of sufficient installation space.

This disclosure is based on the creation of a digital image of the real fan, namely by depicting its properties by use of mathematical calculation models and possibly using known data, possibly real measurement data. The real measurement data can be current measurement data from the ongoing operation of each individual motor (and possibly its history). Furthermore, at least one operating parameter-specific algorithm is created in consideration of known relationships, characteristics, etc. and used for further calculation.

Component states of the fan are determined or calculated via the digital image by use of virtual sensors. These component states are fed to the operating-specific or operating parameter-specific or product-specific algorithm, which determines or calculates specific operating parameters of the fan from the component states and possibly, derived therefrom, supplies predictions relating to the operation of the fan, for example, predictions of the service life of the fan. It is advantageous that the combined use of determined component states and real measurement data is possible.

Two different software components are used here, namely a first software component relating to the digital twin and a second software component relating to the operating parameter-specific algorithm, which can be referred to as an "intelligent" algorithm.

The digital twin is a digital image of a real, individual object, in the case of the teaching according to the disclosure of a fan or a fan system. The digital twin depicts the properties of the fan by use of a calculation model and possibly using known data of the fan. The task of the digital twin can be considered that of calculating component states of the components of the fan as a function of the respective operating state using virtual sensors. The component states determined on the basis of such a calculation are transmitted to the operating parameter-specific algorithm, which determines/calculates operating parameters or operating states of the fan from the operating data of the digital twin, for example, the bearing service life and/or the bearing grease service life. Based on the result, a situation-suitable control adjustment is possible. Operating parameters and operating states are equally relevant insofar as they are calculable variables.

The above-explained combination of digital twin and operating parameter-specific algorithm may be implemented in terms of a digital twin algorithm on a microprocessor associated with the motor of the fan and may thus be associated with the fan as a fixed component.

The digital twin algorithm is the combination of a digital twin describing the fan with a type of intelligent algorithm that is configured for specific operating parameters.

With a suitably configured fan, predictive maintenance may be carried out with the goal of avoiding a fan failure, for example due to a damaged bearing or bearing grease. An effort is made for a situation-suitable adjustment of the system parameters to be able to achieve nearly the maximum possible service life of the fan.

Using a digital image of the fan and operating parameter-specific algorithms, the goal of predictive maintenance is to exhaust the service life of the fan components as completely as possible and at the same time to avoid any failure of the fan. The service life of the fan is calculated on the basis of calculated component states and operating parameters resulting therefrom.

The digital twin uses physical and/or mathematical and/or statistical and/or empirical and/or combined models to calculate thermal and mechanical component states. In any case, both mathematical and also physical and non-physical models are included. The operating parameter-specific algorithm (intelligent algorithm) requires the component states determined by the digital twin in order to determine any operating parameters, for example also to predict the fan failure. Since the service life of a fan primarily depends on the ball bearings and the ball bearing grease, the operating parameter calculation focused on the ball bearing grease and the ball bearing plays a very special role.

It is known from practice that the service life of bearing grease largely depends on the operating temperature. The higher the operating temperature over the entire service life, the faster the bearing grease will be consumed. It is therefore important to determine the storage temperature in order to determine the bearing grease service life.

To determine the bearing temperature, a temperature sensor would have to be positioned in the immediate vicinity of the bearing. This is not possible due to the geometrical and functional conditions of the fan/motor. Accordingly, in the manner according to the disclosure, component states such as the bearing temperature are calculated via the digital twin together with an operating parameter-specific algorithm.

The calculation is based on a mathematical model, which in turn is based on a reduced coupled thermomagnetic calculation model. The combination of a digital twin together with an operating parameter-specific algorithm calculates heat sources, heat sinks, and the thermal state of the overall system relating to the motor of the fan. The bearing grease temperature can may thus be determined via the virtual sensors of the digital twin as a function of the operating state of the fan/motor and fed into the operating parameter-specific algorithm as the operating state.

Both the digital twin, including its virtual sensors, and the operating-parameter-specific algorithm may be implemented in the machine code (C code) on the existing microprocessor. As such, a certain machine intelligence is thereby incorporated into the fan.

The preceding explanations describe a method for determining operating states of a fan using a digital image (digital twin) of the fan with the addition of at least one operating parameter-specific algorithm. This is the basis for the disclosure described below, which is based on the task of calculating operating states, which are determined using virtual sensors, on the basis of a digital twin algorithm, wherein a workflow is defined to implement the digital twin algorithm with respect to the fan. For example, it is important to save real sensors for determining operating states.

According to the disclosure, the above object is achieved by a method having the features of claim 1, namely by a method for optimizing the efficiency and/or the running performance of a fan, wherein, starting from component-specific or function-specific numerical detailed models, on the basis of at least one algorithm, a model reduction and thus data reduction (data refinement) to component-specific or function-specific behavior models takes place, wherein the reduced data of the behavior models are coupled or combined in a system simulation to form a system behavior model having input and output variables, and wherein the input variables and associated output variables of the fan from the system behavior model are provided to an optimizer for selection in order to achieve optimized control of the system depending on framework conditions.

According to the disclosure, this relates to the digital twin algorithm in the context with the "intelligent" fan, in terms of a refinement of the twin algorithm explained at the outset.

The further refinement of the digital twin algorithm is to be understood as an independent situation-suitable adjustment of the system parameters of the fan or the fan system to ensure the best possible efficiency and the best possible running performance at every operating point.

According to the disclosure, firstly numerical detailed models are created, for example, relating to a thermal model, a magnetic circuit model, or a model relating to the blade position and the flow or flow conditions. The detailed model can also be a digital twin corresponding to the introductory discussion with respect to a fan environment, for example, a data center in the sense of an overall system. The detailed model can also relate to the digital twin of a fan arrangement.

For example, detailed models may also be generated relating to a fan arrangement on a condenser. The fans are individually regulated by an optimizer, which accesses the system behavior model to implement the best possible efficiency and a homogeneous pressure/flow over the complementary condenser. Further detailed models are conceivable.

In a next stage, the reduction of the detailed models takes place as part of a model reduction, namely to so-called behavior models. This is accompanied by a not inconsiderable reduction of the occurring data.

The system simulation then couples the behavior models having the reduced data, resulting in a behavior study having a combined behavior model.

The entire system is simulated in the system space using a homogeneously distributed input variable combination. The result is a table having the input combinations and associated system output variables. The table reflects a system behavior model, namely having input variables and associated output variables of the fan. An optimization can take place on the basis of these variables.

In ongoing operation, an optimizer searches in real time for the best possible system output variables depending on the environmental conditions, for example, the system efficiency in the table of the behavior model. As soon as the best possible system output variable is found, the associated input variables can be read from the table. The system is regulated in the best possible manner using these input variables, (e.g., in real time).

In the light of the above, it is advantageous that the optimizer selects the optimal system efficiency from the system behavior table and supplies the control system with the necessary input variables. Continuous optimization is thus possible.

There are various options for advantageously implementing and refining the teaching of the present disclosure. For this purpose, reference is made on the one hand to the claims subordinate to claim 1 and on the other hand to the following explanation of exemplary embodiments of the disclosure with reference to the drawing. In connection with the explanation of the exemplary embodiments of the disclosure with reference to the drawing, specific embodiments, and refinements of the teaching are also explained. In the figures FIGS. 1 to 13 show method stages for implementing the teaching according to the disclosure with special characteristics, wherein the teaching according to the disclosure is discussed by way of example on the basis of FIGS. 4 and 5.

Figure 2:
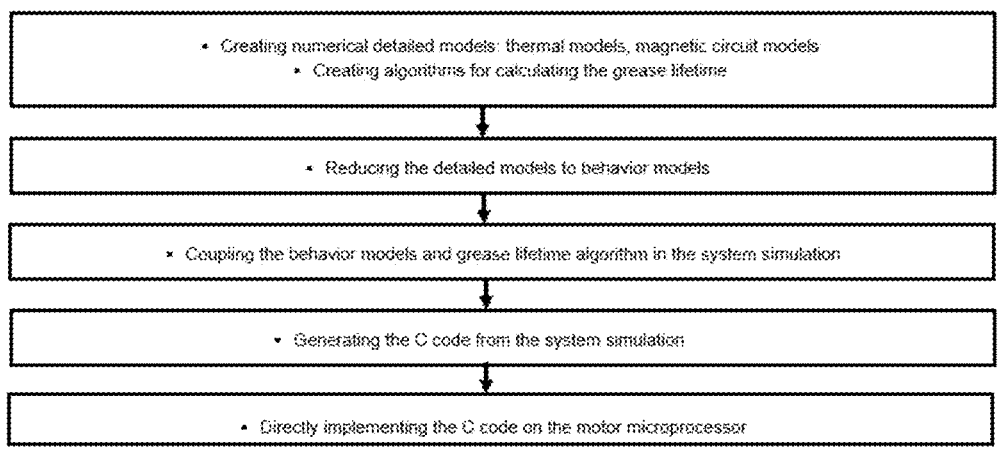
Figure 3:
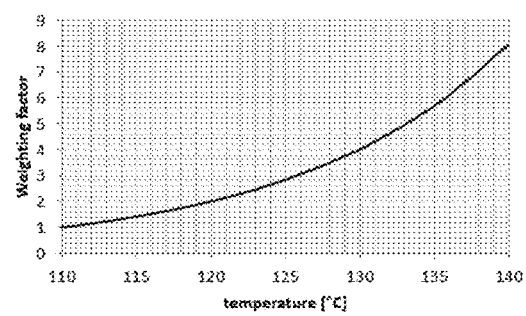

FIGS. 1 to 3 illustrate embodiments according to the disclosure and relate to the digital twin and the digital twin algorithm as the basis for the intelligent fan.

Specifically, FIG. 1 shows the combination of the digital twin with at least one operating parameter-specific algorithm, which is referred to below as the digital twin algorithm. This may be illustrated using the example for the service life of the bearing grease and/or the bearing.

As already noted, the service life of bearing grease and bearing is dependent on the operating temperature and the speed of the motor. Since no temperature sensor is positionable in the immediate vicinity of the bearing, the bearing temperature has to be calculated by use of a model, according to the disclosure using the digital twin algorithm, which results from a combination of a digital twin and an operating parameter-specific algorithm (intelligent algorithm).

The digital twin is nothing more than a mathematical model, which is based on a reduced coupled thermomagnetic and mechanical calculation model. The digital twin calculates the thermal and mechanical condition of the overall system affecting the motor. The digital twin can determine the bearing grease temperature depending on the operating state of the motor by way of the virtual sensors associated with the digital twin.

The intelligent algorithm requires the component states for further processing of the data, for example to predict the fan failure. The failure of the motor can be calculated or at least estimated on the basis of failure characteristic curves. All of the software relating to the digital twin algorithm is implemented in the machine code (C code) on the motor microprocessor, so that no further electronics are required.

FIG. 2 shows the sequence of the bearing grease service life calculation of the bearing grease in the bearing of a fan motor. Numerical detailed models, specifically thermal models, magnetic circuit models, etc. are required in the scope of creating the digital image of the real fan. In addition, algorithms for calculating the grease service life are created.

The detailed models are then reduced to behavior models so that the data volume is manageable.

The behavior models and the algorithm that calculates the bearing grease service life are then coupled in a system simulation, namely as in the scope of a combination of the digital twin with the operating parameter-specific algorithm, which in the present case calculates the bearing grease service life. The C code is generated from the system simulation and the C code is directly implemented on the motor microprocessor.

As previously stated, the model reduction of the detailed model to a behavior model is required to reduce the computing time. As a result of this measure, the digital twin algorithm can be implemented on the microprocessor of the motor. Various methods can be used for thermal model reduction, for example the Krylow method. The data of the detailed model are reduced by reducing the model order.

The magnetic detailed model can be reduced by an algorithm or by a table. Pre-calculated results are defined in the table for certain constellations, so that complex calculations may be replaced by a quick value search. With the correspondingly reduced models, the bearing grease temperature and the bearing temperature can be calculated. The calculated values use the operating parameter-specific algorithm, here the algorithm that calculates the bearing grease service life, in order to calculate the service life of the bearing grease, on the one hand, and the bearing, on the other hand.

It is also possible to weight, (e.g., exponentially), the consumed service life of the bearing/the bearing grease depending on the operating temperature.

FIG. 3 shows the curve of such a weighting factor over the temperature curve, wherein the bearing grease service life calculation is based on exemplary parameters such as continuous operation, type of bearing, viscosity, speed, grease temperature, and operating time/service life. With an operating time of four minutes, the calculation example gives a consumed lifetime of 15 minutes.

The reduced models according to the digital twin and the operating parameter-specific algorithm relating to the bearing grease service life are integrated into a system simulation and linked together. The system simulation can be created, for example, in the MATLAB program. Using the MATLAB code generator, it is possible to translate the system simulation into the C code and implement it on the motor microprocessor.

Figure 4:
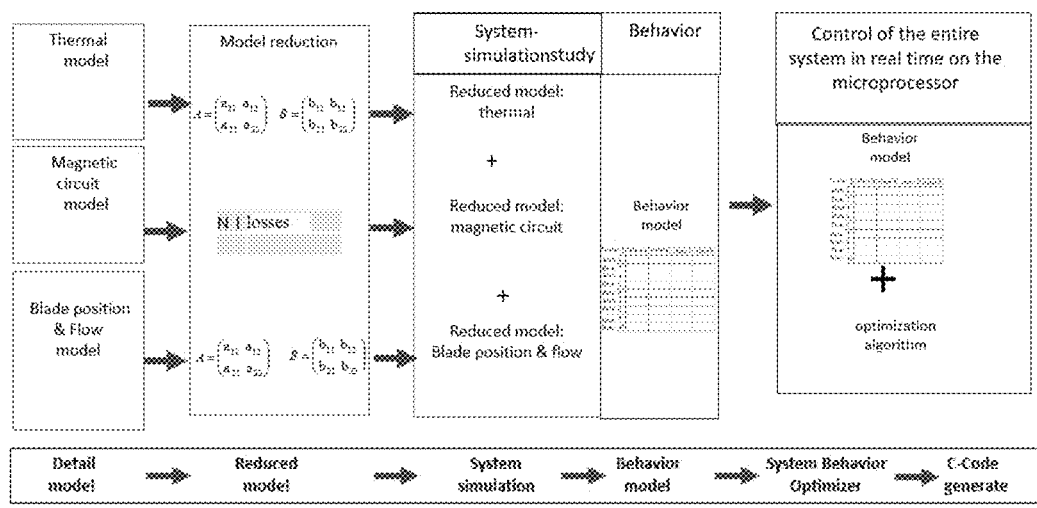
Figure 5:
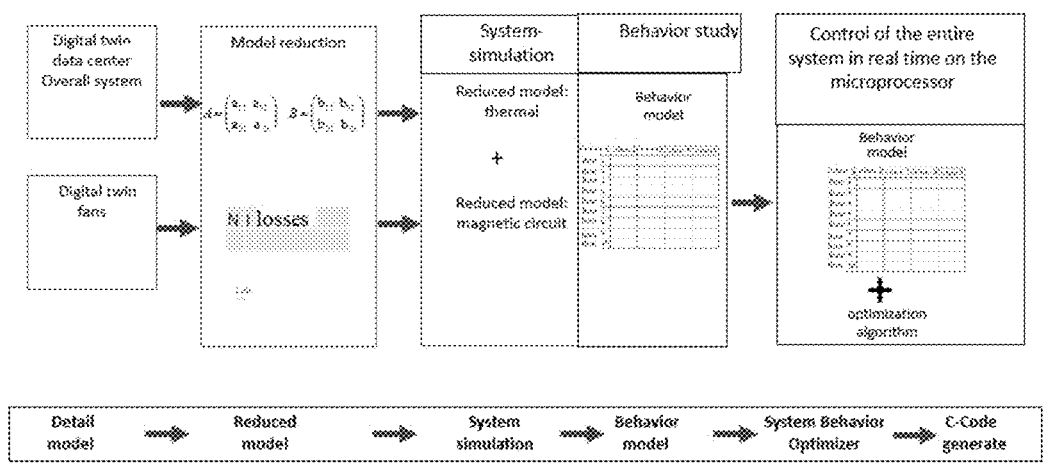

FIGS. 4 and 5 show the individual stages of the method according to the disclosure, wherein FIG. 4 relates to the setting of the blade angle and FIG. 5 relates to the load distribution of fans of a data center. The respective method stages from creating or providing a detailed model via a reduced model, a system simulation up to a behavior model are identical in both cases. Using the behavior model as a basis, the optimizer searches for the optimal system efficiency from the system behavior table and transfers the corresponding input variables to the controller, wherein control takes place in real time. The procedure and data are generated in the C code so that the optimization can run on a standard processor.

According to the illustration in FIG. 4, the angle of the blade setting of the blades of the fan is to be controlled in such a way that an optimal system efficiency results depending on the operating point. Based on a suitable algorithm, a reduced model is derived from the detailed model, which results in a behavior study or a behavior model resulting therefrom in the scope of a system simulation, on the basis of multiple detailed models. The optimizer selects the optimal system efficiency from the system behavior table and transfers the corresponding input variables with which the optimization can be achieved to the control mechanism. The entire system is controlled in real time on a microprocessor, namely on the basis of the behavior model and the algorithm used for optimization. The data and the algorithm for programming are provided in the C code.

The illustration in FIG. 5 involves the load distribution of an arrangement of multiple fans, in the selected exemplary embodiment the load distribution of fans of a data center. The flow speed and the load distribution of individual fans thus required is to be controlled in such a way that an optimum system efficiency results depending on the prevailing temperature in the data center. The optimizer also selects the optimal system efficiency from the system behavior table here and transfers the corresponding input variables to the control mechanism, so that control of the entire system can take place in real time on a microprocessor. The data of the behavior model are also fed here to the algorithm used for optimization, wherein the program runs in the C code on conventional processors.

On the basis of the data reduction explained above, the method according to the disclosure allows a compact C code to be created which can be operated on standard microprocessors. A kind of data refinement (Big Data Smart Data) takes place on the microprocessor, wherein this is the calculation result. Only the compressed, refined data are further processed or, for example, sent to a cloud. It goes without saying that this significantly reduces the streaming volume of the connection to the cloud.

Furthermore, the operating parameters determined on the basis of the digital twin and operating parameter-specific algorithm may be used for the predictive maintenance and for the maintenance of a fan, on the one hand, and for the optimization of the design and the operation of a fan, on the other hand, wherein according to the teaching claimed here, the digital twin algorithm is refined for independent situation-suitable adjustment of the system parameters, namely to ensure the best possible efficiency and the best possible running performance at every operating point.

Figure 6:
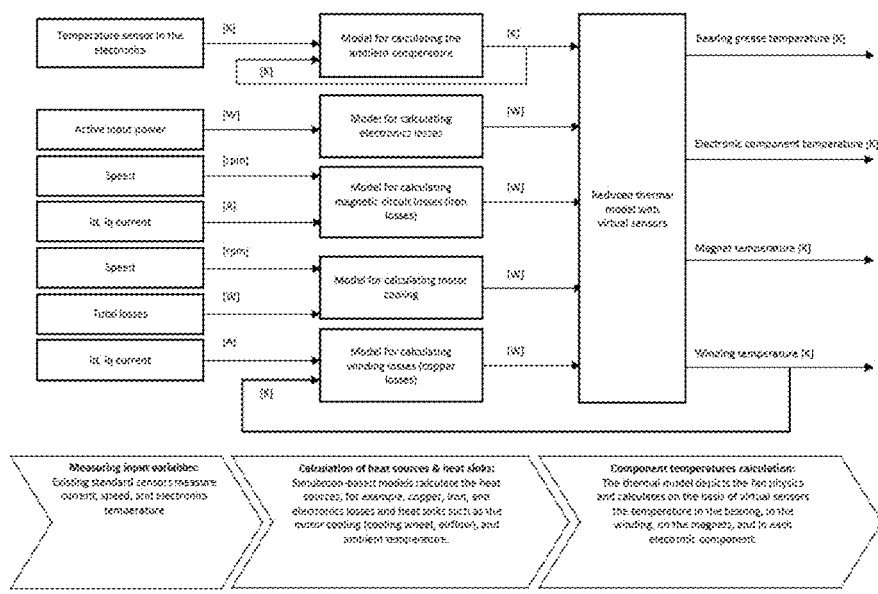
Figure 7:
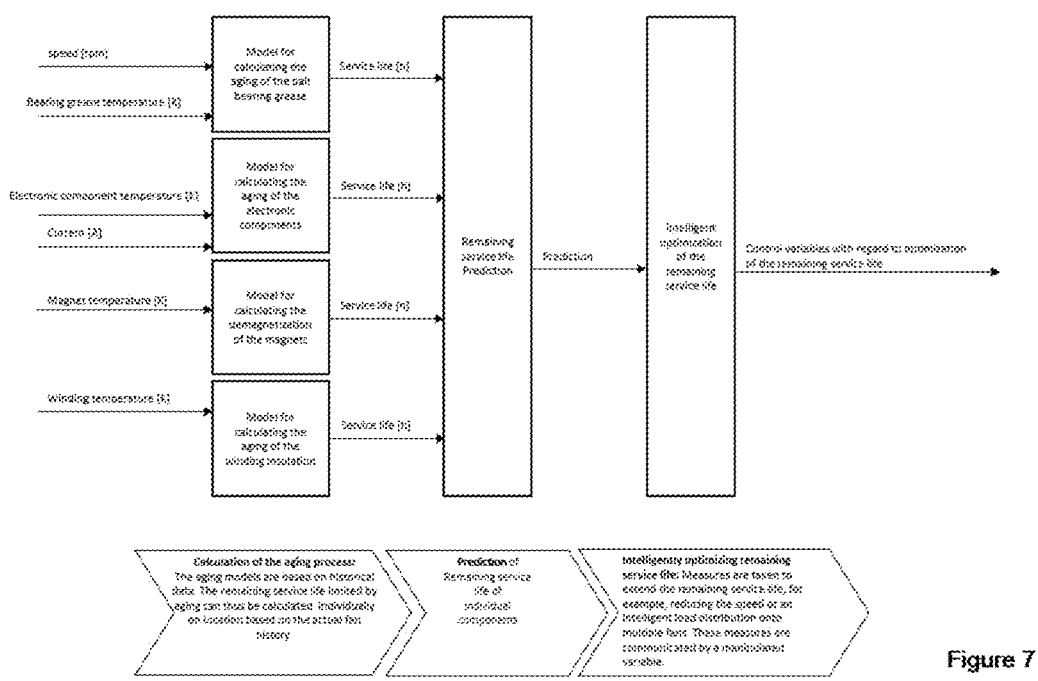
Figure 8:
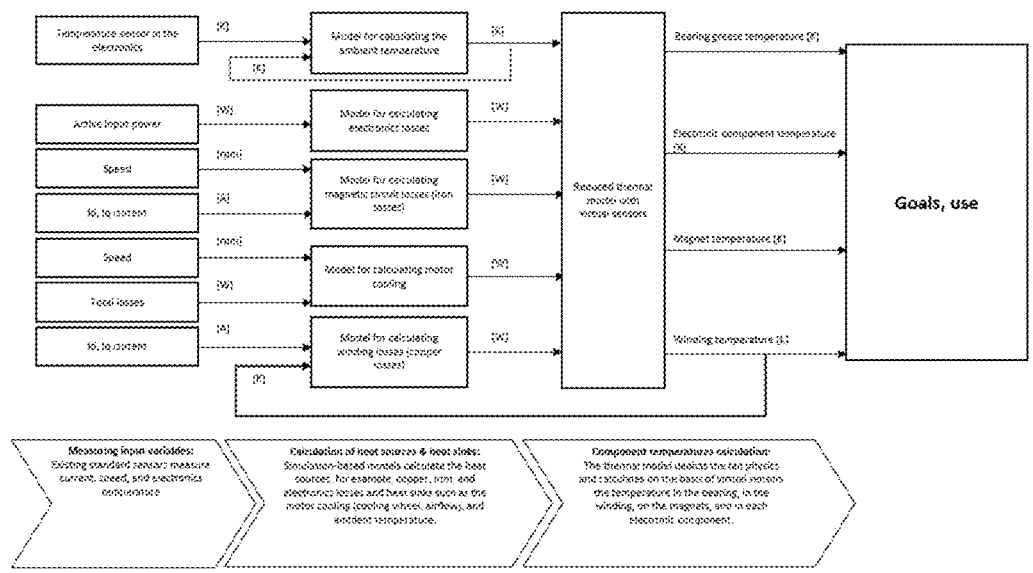

The illustration in FIGS. 6 and 7 is used to further explain the claimed teaching as has already been discussed by way of example with reference to FIGS. 4 and 5.

The use of a digital image, namely a digital twin of the fan, is advantageous. The digital twin results from data processing. Specifically, it results from a combination of known input variables or sensor measured values with calculated values and calculations/models. The determination of component temperatures, flows, losses, etc. at specific predetermined points of the fan is carried out on the basis of the digital twin. Real values, for example, specific component temperatures, are virtually determined on the basis of the digital twin, namely if an economically/structurally reasonable option for measurement by use of sensors does not exist on the respective specific point of the fan.

The operating parameter-specific algorithm is of further importance for the claimed teaching. On the basis of the results or data supplied by the digital twin, for example the bearing temperature, parameters, for example, a probability of failure or consumed service life of the fan or the bearing of the fan are determined. These parameters are dependent on the current operating parameters of the fan and its history, i.e., at which operating points and environments the fan is/was operated.

FIGS. 6 and 7 illustrate, on the basis of a specific example, the method according to the disclosure for determining operating states of a fan using a digital image of the fan in consideration of the above statements.

In the left column of FIG. 6 there are measured or calculated input variables including the units assigned to the arrows. These input variables are measured via existing standard sensors or are known.

Heat sources and heat sinks are calculated from these input variables. It is based on simulation-based models that take into consideration heat sources, for example, copper, iron, and electronics losses and heat sinks such as the motor cooling (cooling wheel, air flow, and ambient temperature). This results in input variables for a reduced thermal model using virtual sensors. All this corresponds to the digital twin in the sense of a thermal model.

Component temperatures are calculated from the reduced thermal model using virtual sensors. The thermal model images the fan physics and calculates on the basis of virtual sensors the temperature in the bearing, in the winding, on the magnets, and in the various electronic components, as needed.

As a continuation of FIG. 6, FIG. 7 clearly shows that output variables from the reduced thermal model, possibly with further parameters, are used as input variables for calculating the aging process. Underlying aging models are based on historical data and can be stored as characteristic curves. The remaining service life limited by aging can thus be calculated or corrected individually on location based on the actual fan history and the current operating status.

The respective models for calculating the aging result in a calculated service life in days or hours, which in itself can be used solely as information. The relevant items of information can then be used for the further prediction, namely the prediction of the remaining service life of the individual components or of the entire fan. This prediction can then be used for the intelligent remaining service life optimization. Measures can be taken to extend the remaining service life, for example, a reduction of the speed or an intelligent load distribution onto multiple fans. These measures can be communicated by a manipulated variable.

FIG. 8 shows once again the digital twin up to the reduced thermal model using virtual sensors, wherein the fan including the motor is thus depicted. As previously stated, the thermal model depicts the fan physics and calculates various temperatures on the basis of virtual sensors, which are used for different purposes/goals/uses, in keywords, for example:

for monitoring: determining operating parameters with the aid of virtual sensors and using them for monitoring. These can be: warning messages, status LEDs, comments in a readable error code, images in the cloud or app application, display in user interfaces.

for predictive maintenance: method for determining the aging of a fan, consisting of numerous subsystems such as ball bearings, windings, electronic components, magnets, and predicting the remaining service life. Use, for example, to plan maintenance intervals, to achieve the longest possible service life before the maintenance interval (i.e., no maintenance too early), automatic scheduling of maintenance appointments, notification of need for maintenance, automatic ordering of replacement parts.

for optimization: method for determining operating states relating to the product performance, i.e., efficiency, component temperatures, speed, output power, volume flow, volume, vibrations, etc.

for creating an intelligent fan: response to specific operating states to improve the behavior or to achieve specific goals.

Changing the operating point/change of the control parameters for optimum efficiency.

Changing the operating point to achieve the longest possible service life.

Reducing the speed if the probability of failure is very high:

Changing the operating point with a day-night rhythm for the quietest possible night use.

Outputting a manipulated variable for additional devices or customer devices, for example, temperature output for use in control of a heat pump, or for additional cooling.

Intentionally avoiding critical system states (e.g., resonance, excess temperatures, etc).

Figure 9:
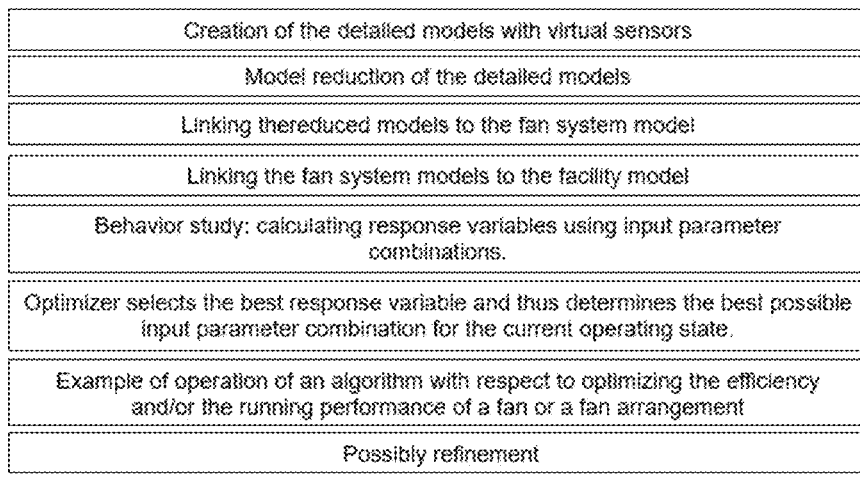

For a better understanding of the teaching according to the disclosure, on the one hand, the sequence of the method stages and, on the other hand, their contents are important. The sequence of the respective process stages may be derived from the development workflow of the underlying algorithm. This is shown in FIG. 9, wherein the method can be refined in a last stage.

The following is fundamentally relevant for creating a detailed model:

A model is an image or an approximation of reality, which by definition means an approximation. A model is always limited to a section that is of interest for the intended image. In addition, a model is fundamentally not complete, since it is either reduced for easier use in terms of its necessary input variables, or individual physical behavior elements are not known when the model is created. Depending on the later use and objectives, a different type of modeling is necessary, for example a different region under consideration, a different accuracy required in the results, or the speed of the calculation. There are very many types of models, wherein in the technical field a model is usually linked to a mathematical representation, for example, to algebraic equations or inequalities, systems of ordinary or partial differential equations, state space representations, tables, graphs.

Virtual product development using FE simulation (Finite Element Simulation) is an integral part of current product development. Classically, a physical domain (e.g., strength or thermal or magnetic circuit) is imaged in a very large (order of magnitude of 100 gigabytes) and computation-intensive model and the results are determined at millions of points (nodes) in the model. This is a variant of detailed models. The rough sequence in the creation of these detailed models can be outlined as follows:

1. Importing a 3D geometry, for example from the field of CAD,
2. Assigning boundary conditions, i.e., fixed clamps, material definitions, contact conditions (adhesive points, sliding connections, thermal insulation),
3. Networking (splitting the geometry into millions of small elements that are linked),
4. Applying the load, i.e., forces, heat sources/heat sinks, magnetic fields, 5. Automatically solving the resulting differential equations for each individual element and merging them to form one large result for the overall model,
6. Evaluating the results.

The creation of detailed models using virtual sensors with respect to fans/overall systems having fans results as follows:

Detailed models are created with the goal of being able to depict the physics of the fan and/or the overall system. So-called virtual sensors are defined calculation points in the detailed models. These virtual sensors calculate component states, for example the winding temperature in the detailed thermal model of the fan. Detailed models are simulation models that are complex in terms of computing time, the required computing power, and the memory requirement. Such detailed models, for example, thermal models, magnetic circuit models, electronic models, control models, force models, or vibration models are used to calculate non-linear operating states. The physical effects of the system include interactions between the domains, which is why the individual models have to be considered coupled in the overall system. Calculations using detailed models in the overall system are not practical in terms of computing time, since interactions cannot be evaluated in real time. A model reduction is therefore necessary.

The generation of reduced models can be carried out as follows:

A model reduction very generally describes an existing model in order to reduce further information, for example to optimize it for memory requirement or computing speed. There are many variants depending on the specific application here, such as:

Approximation of simple mathematical functions, such as polynomial functions, and only storing the coefficients.

Storing tables for various input variables and subsequently either using these discrete values or interpolating between the values.

Approximating statistical models that supply predictions from previous values.

Graphs/logical gates, example: if T>200° C., then fan is defective.

Generation of the Reduced Models—Example a)

The starting point for the reduced model is an FE model of thermals, which depicts the temperatures in every point of the model depending on the heat input and heat output. In the following example, the model reduction is simplified to only one heat input and one heat output, only one temperature to be determined at point A, and only the values "high" and "low" in each case. For this purpose, a parameter study is carried out, whereby this so-called "look-up table" is determined:

| Temperature at the point A | Heat input = low = 1 W | Heat input = high = 11 W |
|---|---|---|
| Heat output = low = 1 W | 40° C. | 80° C. |
| Heat output = high = 5 W | 20° C. | 60° C. |

There are subsequently several options for using the results.

Using the table directly and discreetly. Example: If a temperature at point A is to be predicted for a heat input of 4 W and heat output of 1 W, the value of 40° C. is adopted directly.

Using the table and linearly interpolating between the values. Example: If a temperature at point A is to be predicted for a heat input of 5 W and heat output of 1 W, the value of 60° C. is determined via linear interpolation.

Using the table to determine a temperature prediction function by use of regression. Examples of target functions are polynomial functions, linear functions, exponential functions, statistical functions, differential equations, etc. Subsequently determining the temperature with the aid of this function.

Generating the Reduced Models—Example b)

The starting point for the reduced model is an FE model of thermals, which depicts the temperatures in every point of the model depending on the heat input and heat output. Subsequently, compact state space models can be approximated using mathematical assumptions, calculations, and transformations (for example, LTI system or Krylov subspace method). These consist of two differential or integral equations and four matrices that describe the entire system (for example, 200×200 matrices filled using scalar numeric values). However, these no longer represent the temperature at millions of nodes, but only at a few selected points. In addition, the approximation leads to a deviation of the results depending on the size of the state space model. Basically, the larger the model and its matrices, the smaller the deviation.

State space models are available as procedures, modules, or objects in many computer algebra programs such as Matlab or in programming languages as standard features, which means that such models can be calculated by simply importing the matrices. Input variables are, for example, heat power that enters the system and heat sinks due to convection, output variables are, for example, specific component temperatures (for example, three different component temperatures).

Generating the Reduced Models—Example c)

In this example, the starting point for the model reduction are experimental results. Here, just like in example a), a table would be created from measurement results and the equivalent procedure would be used thereafter (discrete use, linear interpolation, or regression by using mathematical functions).

A coupling of physical domains or various models can be of further importance.

Classically, domains are considered individually in virtual product development, since a joint consideration is very computing-intensive and memory-intensive and is hardly practical. The model reduction offers the possibility of coupling the models from different domains. For example, coupling a detailed magnetic circuit model, whose computing time on a high-performance computing cluster takes several days to weeks, with a thermal model is not advantageous. By reducing the detailed models, the required computing power and the memory requirement become lower, and the coupling of the models with regard to the economic aspect is made possible. In many cases, this is necessary to depict the real behavior as accurately as possible.

Coupling of Physical Domains or Various Models—Examples

The winding resistance is approximately linearly dependent on the temperature of the copper. Depending on the winding resistance, the power loss in the winding changes approximately linearly. Depending on the power loss, the thermal behavior changes, for example, the winding and bearing temperature is strongly non-linear, which in turn affects the winding resistance. Depending on the requirements for the results of the model, a coupling is necessary here.

The required torque and the speed of a fan are strongly dependent on the facility resistance and, for example, the pressure difference and temperature of the conveyed medium. The behavior of the magnetic circuit, i.e., currents through the winding, magnetic field, speed, etc., changes depending on the load torque. Depending on this, power consumption, losses, and achievable speed also change. Here too, in the case of a customer application, it is conceivable to couple the fan behavior to the installation situation depending on the application.

Specification of a Technical Implementation—Example a)

Creating a thermal FE model of a fan→computing-intensive and memory-intensive FE model having 1,000,000 elements in addition to the polynomial function. Heat sources and heat sinks are depicted as polynomial functions as a function of the input current and speed.

Creating a reduced thermal model via statistical methods, which depicts the electronic component temperature as a function of input current and speed. Polynomial function that describes the temperature as a function of input current and speed=virtual temperature sensor.

Characteristic curve from the data sheet on the service life of the electronic component depending on its temperature→Operating parameter-specific algorithm that calculates the probability of failure from a virtual temperature sensor.

Use for predictive maintenance, for monitoring, or for optimizing the operating point→Intelligent algorithm.

Specification of a Technical Implementation—Example b)

Detection of current pointer and motor speed by integrated electronics/control. The electromagnetic operating point is derived from this.

Based on this operating point, the losses of motor and power electronics result from look-up tables or polynomial functions.

A thermal model processes the loss values and determines the temperatures of important system components such as ball bearings or semiconductor components.

At the same time, component vibrations are recorded via a real sensor. The local vibrations are virtually projected onto the overall system by behavior models, whereby, for example, the bearing load due to vibrations is estimated.

With the aid of operating parameter-specific algorithms, determined temperatures and vibration values are converted into an estimation of the component and fan service life.

Further measures such as predictive maintenance can thus be made possible.

At the same time, with knowledge of the losses, the operating point and the system efficiency can be optimized by control engineering adjustments, such as the variation of the pilot control angle.

The above statements on model reduction of the detailed models apply in the scope of an application in fans and/or fan systems, wherein an order reduction can be carried out by using the Krylov subspace method. The goal is to minimize the computing time, the required computing power, and the memory requirement, so that a calculation in real time is possible. The virtual sensors are retained and supply output variables.

According to FIG. 9, the reduced models are linked to the fan system model in a next stage. In concrete terms, the reduced models such as the thermal model, the magnetic circuit model, the software model, the electronic model, etc. are linked to form a fan system model. The fan system model depicts the physics of the individual fan or a fan group or a fan system and calculates the efficiency, the running performance, and any interactions between the individual models depending on the ambient conditions and operating states.

In a next stage, the fan system models are linked to the facility model, whereby an overall system model results. The overall system model consists of several fans and a facility, for example comprising a compressor and/or condenser. The facility model can be implemented using the same workflow as the fan system model. The fan system models and the facility model can then be linked to form an overall system model.

A next stage includes a behavior study, namely the calculation of response variables using input parameter combinations.

The aim of the study is to determine the behavior of the overall system model and to use this knowledge to control the system in real time.

According to the overall system behavior, effects and influences of model input variables on the model response variables are transferred or depicted in the design space.

The design space is a multi-dimensional space that is spanned by the possible input variables. The number of input variables corresponds to the dimension of the design space. With ten input variables, this implies ten dimensions.

The model input variables are varied within defined limits. This creates parameter combinations that evenly cover and thus describe the multidimensional space. The model response variables such as efficiency and running performance are calculated on the basis of the parameter combinations. The behavior study provides a design space that is filled with response variables as a function of the input variables. This space depicts the overall system behavior.

Figure 10:
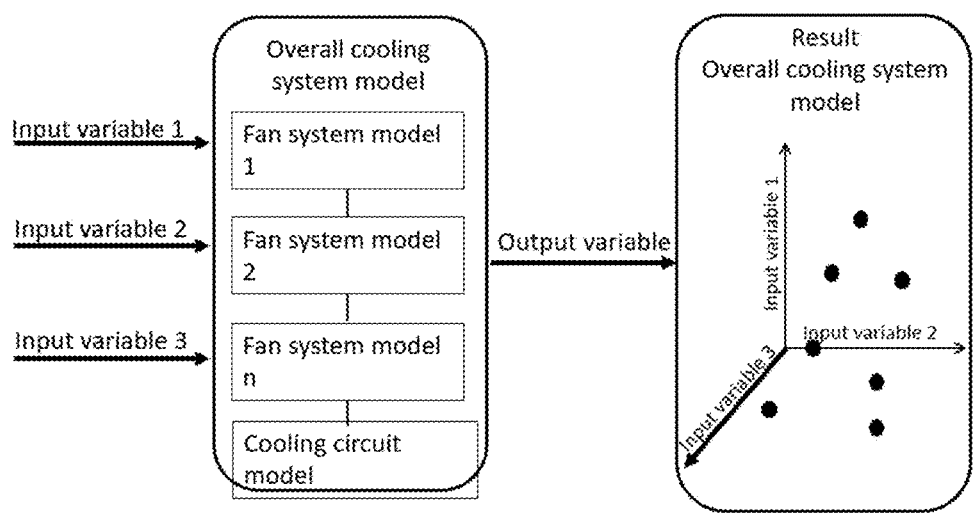
Figure 11:
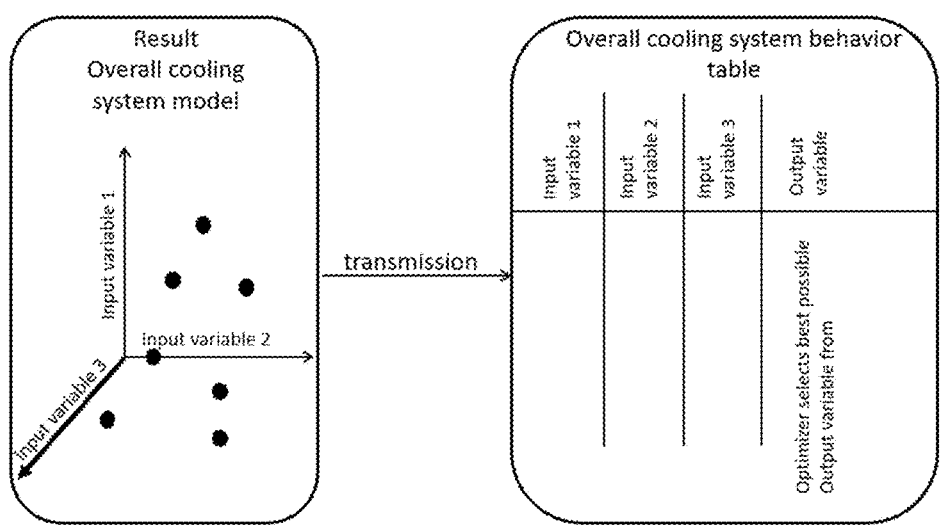

FIG. 10 shows how different input variables flow into fan system models and cooling circuit models, which results in the overall cooling system model. A corresponding output variable is to be understood as the result of the overall cooling system model. The resulting knowledge can be transferred into a behavior table according to FIG. 11. If the overall system behavior is known, the input variables may be adjusted in order to obtain the best possible response variable.

The adjustment or the selection of the response variable and the associated input variable combination from the behavior table is implemented by the optimizer, namely according to the further method stage shown in FIG. 9, according to which the optimizer selects the best response variable and thus selects the best possible input parameter combination for the current operating state.

Figure 12:
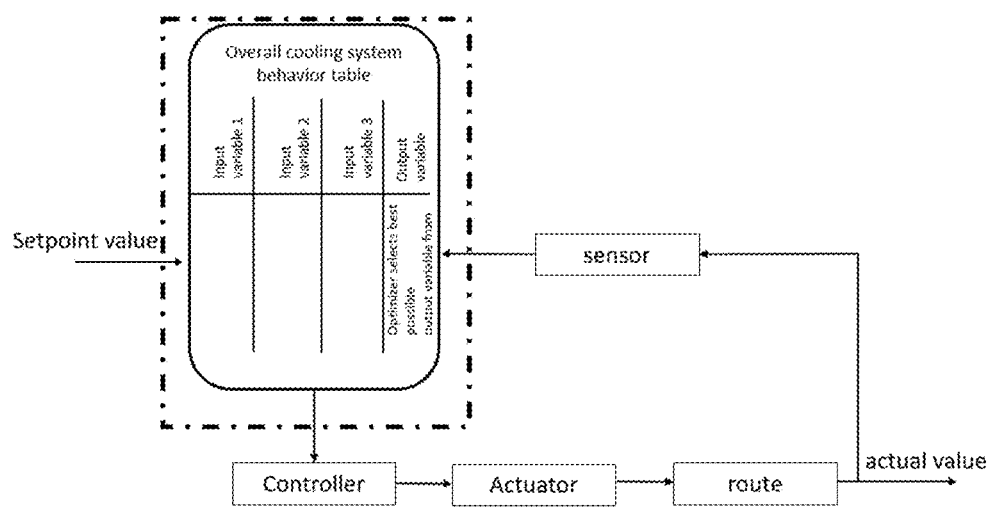

As shown in FIG. 12, the optimizer selects the best response variable and determines the best possible input parameter combination for the current operating state. In other words, the optimizer selects the best possible model response depending on ambient conditions/operating state. The associated parameter combinations of the input variables are set. The system can thus be controlled in the best possible manner. The overall cooling system behavior table can run on any processor (e.g., on a microprocessor of the fan) that is provided in any case. A control is thus possible.

Figure 13:
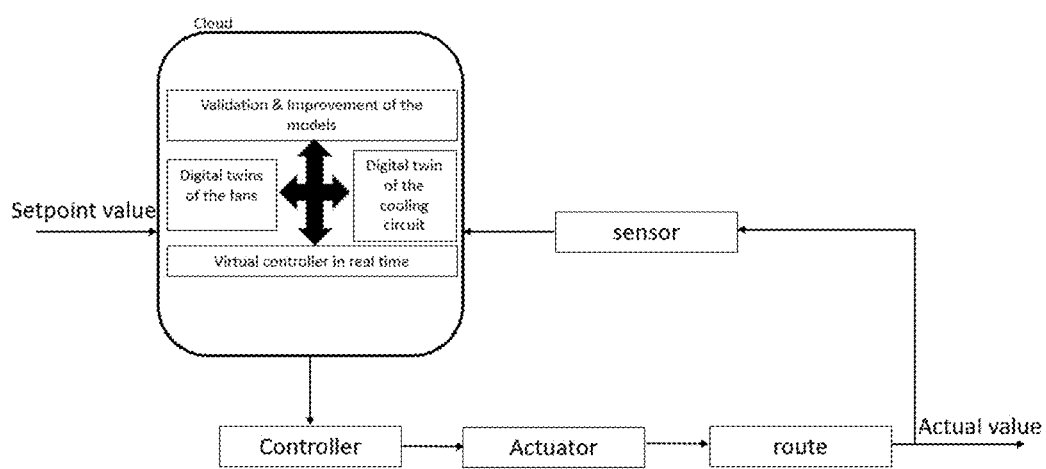

FIG. 13 refers to a possible refinement, according to which the overall cooling system behavior table as shown in FIG. 12 is expanded by a system simulation of the cooling circuit in a cloud. The system includes digital twins of the fan, digital twins of the cooling circuit, a validation unit, and a virtual controller/optimizer.

The digital twins of the fan and the cooling circuit physically depict the system. The virtual controller has the knowledge of the overall cooling system behavior table as shown in FIG. 12. In addition, the virtual controller can learn by machine learning, for example, with respect to the specific customer applications. The validation unit improves the digital twins by comparing setpoint value and actual value. The system thus has the ability to simulate specific customer patterns and to improve the findings resulting therefrom.

Finally, it is to be expressly noted that the above-described exemplary embodiments are used solely to explain the claimed teaching, but does not restrict it to the exemplary embodiments.

The invention claimed is:

1. A method of optimizing efficiency, running performance, and/or service life of a fan, the method comprising:
generating numerical models that describe component-specific or function-specific characteristics of the fan, wherein the numerical models are generated based on the determination of operating states of the fan using a digital image of the fan and at least one operating parameter-specific algorithm, wherein the determination includes performing operations comprising:
generating the digital image of the fan as a mathematical description based on at least one of mathematical calculation models and known data;
creating the at least one operating parameter-specific algorithm in consideration of known relationships and/or characteristic curves; and
calculating component states of the fan via the digital image based on virtual sensors,
performing a model/data reduction on the numerical models to thereby generate component-specific or function-specific reduced behavior models;
generating a system behavior model having input and output variables by coupling and/or combining reduced data of the reduced behavior models;
performing an optimization algorithm based on the input and output variables of the system behavior model to thereby determine optimized control variables depending on ambient conditions and/or an operation state of the fan and wherein the optimization algorithm uses the component states of the fan to determine operating parameters of the fan; and
controlling the fan using the determined optimized control variables.

2. The method of claim 1, wherein the numerical models comprise one or more of:
a thermal model;
a magnetic circuit model;
a blade position and flow model;
an environmental model;
a digital twin model of the fan; and
an overall system model that takes into consideration an environment of the fan.

3. The method of claim 1, wherein data of the reduced behavior models is provided as one or more tables or data matrices.

4. The method of claim 1, wherein data of the system behavior model, including the input and output variables, are provided as a table or data matrix.

5. The method of claim 1, wherein ambient conditions of the fan are used as an input variable and the optimization algorithm selects an optimized output variable by reading the optimized output variable from a table that correlates the input and output variables; and
wherein the method further comprises controlling the fan based on the optimized output variable.

6. The method of claim 5, wherein the optimized output variable characterizes system efficiency.

7. The method of claim 1, wherein an angle of a fan blade position is controlled such that an efficiency results depending on the operation state of the fan, wherein the optimization algorithm selects the efficiency from a system behavior table and feeds at least one corresponding input variable to a control device that controls the fan.

8. The method of claim 7, wherein the fan is an individual fan in an arrangement of fans, wherein the optimized control variables include flow speed and load distribution required gf the individual fan in the arrangement of fans, the method further comprising controlling the individual fan in the arrangement of fans to optimize an overall system efficiency of the arrangement of fans as a function of temperature,
wherein the optimization algorithm selects the overall system efficiency of the arrangement of fans from the system behavior table and feeds the at least one corresponding input variable to the control device that is configured to control the individual fan of the arrangement of fans.

9. The method of claim 1, further comprising:
implementing an optimized control strategy in the form of computer program instructions configured to be executed by a processor-circuit that performs operations to dynamically control the fan in real time.

10. The method of claim 1, wherein the digital image is represented as one or more of a mathematical model, a physical model, an empirical model, a statistical model, and a combined model, and
wherein the digital image is based on a calculation model that includes one or more of a thermal model, a mechanical model, and a magnetic circuit calculation model, and wherein the calculation model is converted by the respective numerical model into at least one of the reduced behavior models.

* * * * *